United States Patent [19]
Aitoniemi

[11] Patent Number: 5,796,933
[45] Date of Patent: Aug. 18, 1998

[54] BACK-UP METHOD FOR EQUIPMENT SETTINGS

[75] Inventor: Aarto Aitoniemi, Nurmijarvi, Finland

[73] Assignee: Nokia Telecommunications Oy, Espoo, Finland

[21] Appl. No.: 693,199

[22] PCT Filed: Feb. 13, 1995

[86] PCT No.: PCT/FI95/00061

§ 371 Date: Aug. 12, 1996

§ 102(e) Date: Aug. 12, 1996

[87] PCT Pub. No.: WO95/22105

PCT Pub. Date: Aug. 17, 1995

[30] Foreign Application Priority Data

Feb. 14, 1994 [FI] Finland ................. 940688

[51] Int. Cl.$^6$ ..................................... H05K 10/00
[52] U.S. Cl. .................... 395/180; 364/184; 340/507; 326/9
[58] Field of Search ................. 395/200.52, 200.5, 395/488, 489, 857, 180, 182.03; 364/184, 187; 340/507, 508; 326/9, 10, 14

[56] References Cited

U.S. PATENT DOCUMENTS 4,750,136 6/1988 Arpin et al. .
5,051,895 9/1991 Rogers .
5,317,723 5/1994 Heap et al. .
5,491,804 2/1996 Heath et al. ..................... 395/827

FOREIGN PATENT DOCUMENTS 281 999 9/1988 European Pat. Off. .
2 116 748 9/1983 United Kingdom .

OTHER PUBLICATIONS

M68HC11 Reference Manual, Motorola, Inc., 1991.
CCITT Recommendation G.703, Geneva, 1991.
CCITT Recommendation G.704, Geneva, 1991.

*Primary Examiner*—Thomas Peeso
*Attorney, Agent, or Firm*—IP Group of Pillsbury & Sutro LLP

[57] ABSTRACT

A back-up method for equipment settings of electronic equipment, especially telecommunications equipment, in which a plurality of parallel board units are located in a subrack or the like. Set data of each board unit are stored in that board unit. A back-up copy of the set data of each board unit is stored initially, the storing taking place in such a way that the addresses of a first and a second other board unit in the equipment are stored in the set values for each respective board unit in such a way that the first address indicates the board unit in which is stored a back-up copy of the set values of the board unit in question, and the second address indicates the board unit for which a back-up copy of its set values is stored in the board unit in question.

12 Claims, 3 Drawing Sheets

BACK-UP METHOD FOR EQUIPMENT SETTINGS

This application claims benefit of international application PCT/FI95/00061, filed Feb. 13, 1995.

BACKGROUND OF THE INVENTION

The invention relates to a back-up method for equipment settings. The preferred range of use of the invention is to back up equipment settings of node equipments in a digital telecommunications system under all operating conditions, but in principle, the solution of the invention is applicable to backing up equipment settings of any similar electronic equipment, e.g. to backing up a database of a telephone exchange or switch.

A telecommunications system comprises a plurality of nodes communicating with each other via transmission paths. A node is constituted by a telecommunications equipment, e.g. a cross-connection equipment, comprising in a manner known per se several board units, which implement one or several telecommunication functions, such as cross-connection. In such a telecommunications equipment are stored a lot of various settings and parameters, the values of which depend on how the equipment in question controls or conveys traffic of the network and how the equipment is supposed to behave in different special situations, such as fault, alarm, emergency service, etc. These set values/parameters are stored in the equipment at the commissioning thereof.

When a board unit of an equipment is damaged, it has to be replaced by a new (i.e. another similar) board unit, the settings of which are either factory settings (a new production board) or other undefined settings (an old serviced/repaired board). It is then necessary to recopy the correct settings into the equipment in order to make it function in a desired manner. The copying is performed by connecting a terminal or another corresponding external device to the telecommunications equipment and by inputting each parameter separately from the terminal to the telecommunications equipment. It is a time-consuming job to go through and check each parameter (there may be even several hundreds of them), which retards a restarting of the equipment and thus of the whole telecommunications system. Additionally, such a manual input of parameters contains a rather high risk of that some parameter or parameters will be inputted to new board units erroneously, which means that the equipment will operate erroneously in future.

SUMMARY OF THE INVENTION

The object of the present invention is to eliminate the above-described problem and to provide a solution, through which a telecommunications equipment, and thus the whole telecommunications system, can be started quickly and reliably in association with a change of board unit.

The idea of the invention is to add such information to the settings that makes the equipment capable of utilizing back-up copies stored inside the equipment independently and quickly in failure and other change situations, in order to return the correct operating copy to the board unit and to bring the equipment as well as the whole network quickly into an operating condition. To implement this operation, the equipment shall be capable, also during its normal operation, of writing all changes made in the actual operating copy into the back-up copies, which are at least one, but preferably two, and of checking whether the copying was successful.

Thanks to the solution according to the invention, it is possible to maintain the settings important for the operation of the equipment even in case of serious equipment failures and the equipment can be brought quickly into an operating condition again, entirely without external settings or commands.

Preferred embodiments of the invention concern primarily additional information to be stored in the settings, by means of which information it is possible to speed up further a correct starting of the equipment in predetermined situations.

BRIEF DESCRIPTION OF THE DRAWINGS

In the following, the invention and its preferred embodiments will be described in greater detail by way of example with reference to embodiments according to the attached drawings, in which.

DETAILED DESCRIPTION

Figure 1:
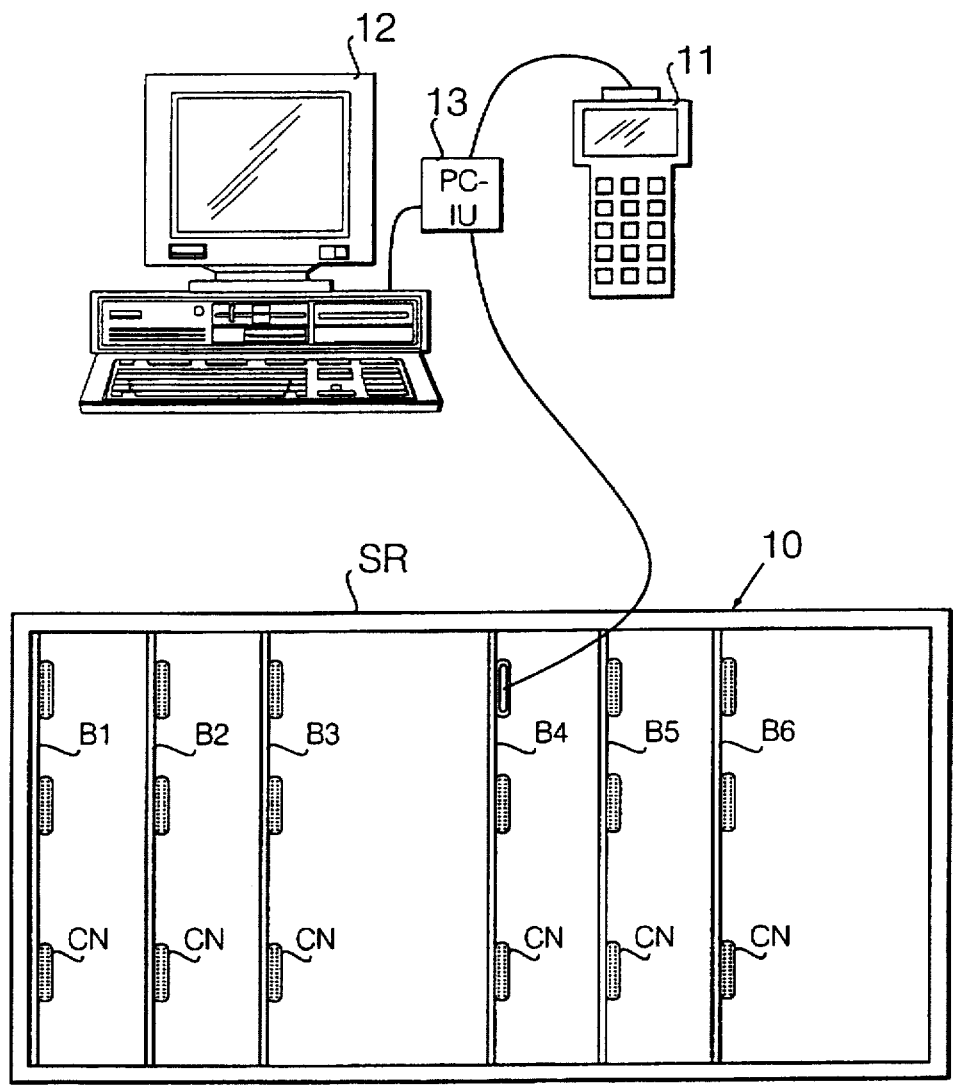
FIG. 1 shows a typical mechanical configuration of a telecommunications equipment and illustrates simultaneously an input of set values.

FIG. 1 is a front view of a subrack SR of a telecommunications equipment 10. Six board units B1 ... B6 are in this case mounted at board locations of the subrack, the units comprising various connectors CN for connecting external devices to the telecommunications equipment and for connecting the telecommunications equipment to a telecommunications network. The abovementioned input of set values is performed, e.g. by connecting a service terminal 11 and a microcomputer 12 via a separate interface device 13 to a board unit in the telecommunications equipment. Subsequently, parameters are inputted from the microcomputer or the service terminal to the equipment 10.

FIGS. 2a to 2d show various architectural models of a typical telecommunications equipment, in this case comprising a cross-connection device. A control portion of the equipment is indicated in the figures by reference mark CU, and additionally, the units performing cross-connection are provided by reference marks DCC (Digital Cross-Connect). A node is connected to the network through interface units IU. Each interface (not shown in the figures) may be e.g. a 2 Mbit/s PCM interface, which conforms to the CCITT recommendations G.703 and G.704 and G.704. If there are interfaces in other units than in the actual interface units IU, the unit in question is provided by the reference mark IU indicated in parenthess.

The units of a node are connected to two different buses CBUS and DBUS, the former being a command bus, along which the units of the node communicate with each other, and the latter being a fast data bus inside the node, intended for transmitting data, coming (from the other nodes of the network) to the cross-connection device, between the different units. In the method of the invention, the internal data bus of the node also acts as a transmission path for set data.

Figure 2A:
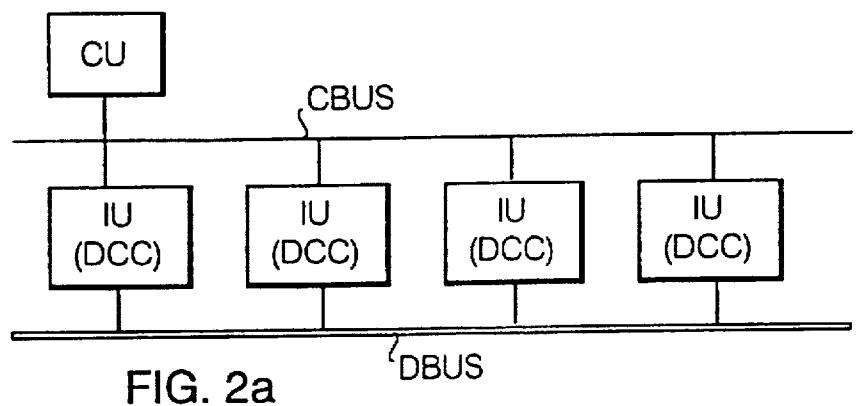
FIGS. 2a to 2d illustrate an operational block diagram of the equipment shown in FIG. 1, and FIGS. 3a to 3c show schematically measures to be taken according to the invention in the telecommunications equipment in various situations.

In the cross-connection device according to FIG. 2a, the control portion CU is a separate unit and the actual cross-connection is decentralized to parallel interface units IU (each of them consisting of its own board unit). All interface units are connected to the same fast DBUS and receive all incoming data, from which they select their own outgoing data. The control unit CU in a mother board of the node is connected to the interface units IU only via the CBUS.

Figure 2B:
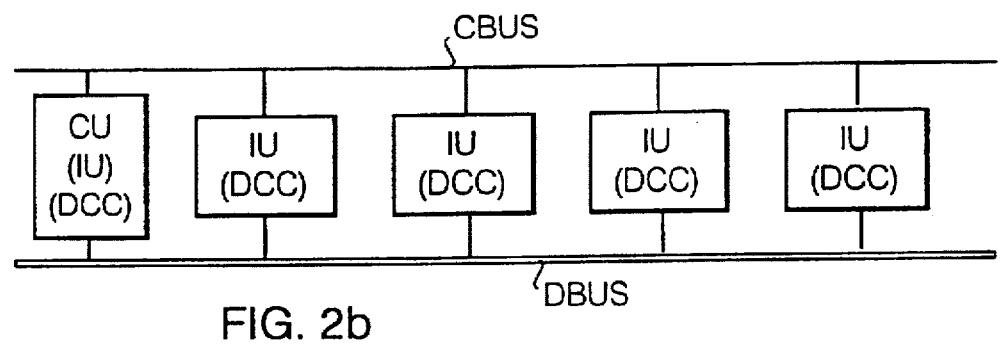

In the alternative shown in FIG. 2b, the control unit CU is parallel with the interface units IU and connected to both buses. The control unit may then also comprise interfaces to the network and cross-connected functions, but it is, however, the only unit capable of controlling the node.

Figure 2C:
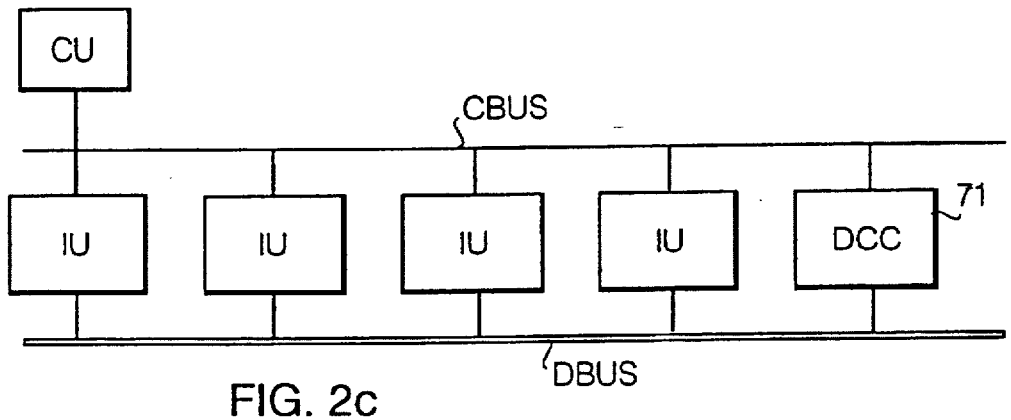

In the alternative shown in FIG. 2c, the cross-connection is centralized in a separate board unit 71, which is parallel with the interface units IU and connected to both buses of the node. This unit receives all incoming data from the DBUS and forms the outgoing data from the node to the bus ready for the interface units. The control unit is separate also in this case and manages the node via the CBUS in the same way as in the case of FIG. 2a.

Figure 2D:
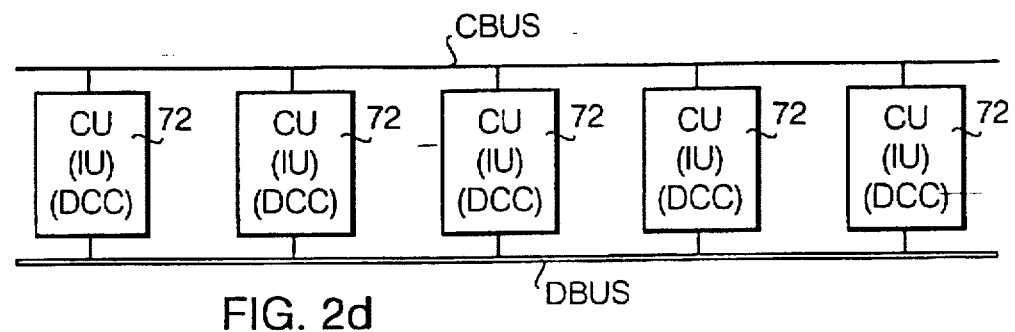

In the alternative according to FIG. 2d, all units 72 comprise both interfaces and cross-connection functions and each of them can also function as a control unit of the equipment, but only one at a time.

As can be concluded from the FIGS. 2a ... 2d, the functional configuration of a node may vary according to which functions are built for each board unit. The only essential thing for the present invention is, however, that the equipment comprises a plurality of parallel board units as in FIG. 1 and that the equipment comprises a control unit CU or the like, capable of reading and processing information stored in the board units. The purpose of the FIGS. 2a ... 2d is only to make it clear how the different parts of the equipment are connected to each other, in other words, that the equipment typically comprises one control unit CU, which reads set data contained in the board units via the bus (CBUS) and processes them and controls the copying of the data from one board unit to another. The control unit may be duplicated to improve the back-up.

Communication on the command bus is implemented in practice in a manner known per se, e.g. by the use of a bus server in each board unit connected to the bus. When the control unit CU desires to send a command and possibly also data to one or several interface units IU, it writes the number of the command and the possible data in its buffer, calls the command bus server and gives it an information of where to find the buffer containing the respective message and to whom the message shall be sent (either to all or only predetermined board units, each board unit having a separate address in the subrack). The command bus server assembles the data, writes this data packet in the buffer and sends it to the command bus servers of the desired interface units. The command bus server of the interface unit performs an error check, disassembles the packet, writes the received commands in the buffer and calls then a message processing portion, which reads the received command and the possible data from the buffer and processes it.

With no other traffic on the CBUS, the command bus server of the control unit polls board or interface units in succession. If these need services of the control unit, they switch on a desired service request bit in their response. The interface units are thus not allowed to send anything spontaneously to the command bus, but they perform a transmission only when they respond to a polling or a request command or when they receive a right to transmit information, which right was applied for in association with polling. In this way, no collisions can occur on the command bus either. For the practical implementation of bus servers can be used e.g. a Motorola 68HC11 processor comprising a built-in serial port connectable to the bus. However, since this communication is not associated with the actual inventive idea, it will not be described in greater detail in this connection. A more accurate description of the subject is available e.g. from M68HC11 Reference Manual, Motorola Inc. 1991, if needed.

Figure 3A:
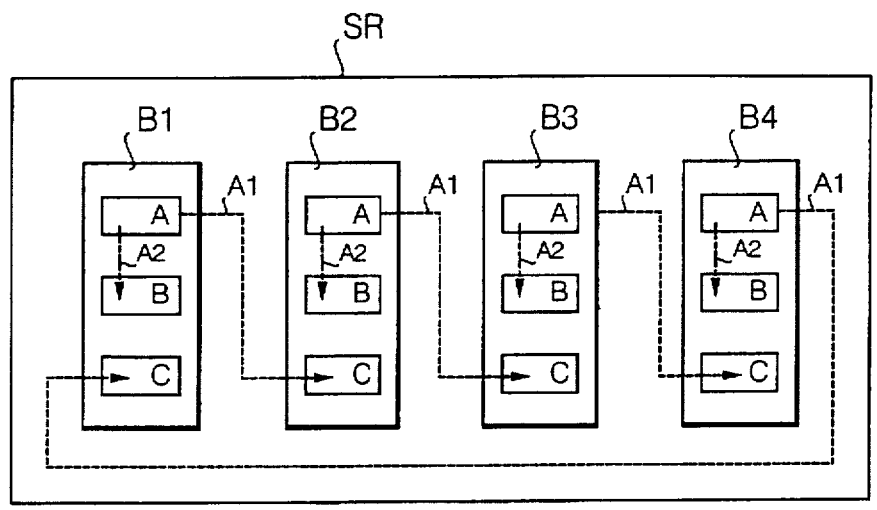

FIGS. 3a ... 3c show measures according to the invention in different operating conditions of a telecommunications equipment schematically. In the figures is assumed that the subrack SR comprises (only) four neighbour board units B1 ... B4. From each board unit are shown three separate storage areas indicated by reference marks A, B and C. The storage areas are preferably implemented by an EEPROM, whereby the data remains stored in the memory in spite of power failures.

In FIG. 3a, the equipment is shown at the commissioning or installation stage thereof. Information is then stored in board units in such a way that the memory of each board unit, e.g. storage area A, contains the settings of the respective board unit, which settings comprise (besides other settings) addresses of two other board units in the equipment, preferably neighbour board units (the former and the latter). One of these other board units is a board unit comprising a back-up copy of the set values of the board unit in question and the other one is a board unit a back-up copy of the set values of which is stored in the board unit in question. Each board location of the subrack does not necessarily comprise a board unit, due to which the other board units are not necessarily physically at directly neighbouring board locations with respect to the board unit in question. As far as the board units at the ends of the subrack are concerned, one neighbour board unit is the board unit which is the last one at the opposite end of the subrack, whereby a closed back-up loop according to the invention is generated.

According to a first preferred embodiment of the invention, the set values of each board unit additionally comprise a first identification number identifying the type of the respective board unit. Board units performing the same task have the same identification number.

The first identification number is not absolutely necessary, but in practice, it is very important, however.

According to a second preferred embodiment of the invention, a second identification number is added to the set values, by which number different equipment configurations are distinguished from each other. Equipment configuration means how the equipment is configured, in other words, how many board units there are in the equipment and at which board locations they are positioned. According to an additional preferred embodiment of the invention, also the time and date informing when the equipment configuration was made can be stored in connection with the second identification number.

The second identification number as well as the date and time are not necessary, but additional advantages to be described later will be achieved by means of them, which advantages are significant in practice. This is true especially as far as adding the second identification number is concerned.

According to a third preferred embodiment, the address of a board unit in the equipment will also be stored in that board unit. This address is determined directly according to the physical location of the board unit in the subrack (at which board location the board unit is positioned). Advantages to be achieved by storing the address will be described below.

According to a fourth preferred embodiment of the invention, the set values of each board unit additionally comprise a checksum calculated from the set values. Checksum is not quite necessary either, but significant advantages (to be described below) will be achieved, however, if a checksum is used.

The first identification number is a board-specific identification number stored in the EEPROM of the board unit at the manufacture of the board unit already. The purpose of the identification number is to prevent a board unit of wrong type from being mounted in the equipment (i.e. copying back-up copy data of wrong type to a board unit mounted in the equipment). The first identification number does not change at reconfiguration of the equipment.

The second identification number is preferably a random number to be generated by a random number generator, which number is stored by the software of the equipment iththe memory of each board unit belonging to the equipment configuration in connection with each configuration process, also re-configuration process. The purpose of the second identification-number is to inform in connection with a change of board unit, whether the new board unit positioned in the equipment is the same as was in the equipment earlier. The significance of the random number will be described more accurately below.

Since the above data have been stored in the board unit at the commissioning or installation stage, the control unit CU of the equipment copies the set data of each board unit to a storage area of "external" settings in the memory of a neighbour board unit. This operation is indicated by dashed line arrows A1 in FIG. 3a and the storage area of "external" settings by reference mark C. The data of the last board unit (B4) of the subrack are copied to the first board unit (B1) of the subrack, in order to create a closed back-up loop as described above. In practice, the data are transferred along the internal transmission bus CBUS (FIGS. 2a . . . 2d).

According to an additional preferred embodiment of the invention, the set data are also copied to another storage area B of the own board unit. This operation is described in FIG. 3a by dashed line arrows A2. Accordingly, the memory of the equipment contains three copies of the settings of each board; the actual operating copy in the very board unit (storage area A), the first back-up copy in a neighbour board unit (storage area C) and the second back-up copy in the same board unit (storage area B). The advantage of using the third copy is that if, e.g., some bit happens to change in the actual operating copy or back-up copy, it is possible to discover more reliably, by comparing the three copies, which one is the faulty one. This does not necessarily succeed, if only two versions of settings copies are used. A change of a bit can be discovered by calculating the above-mentioned checksum and by comparing it with the stored checksum. The third copy can be stored also elsewhere than in the very board unit, e.g. in a microcomputer connected to the equipment (cf. FIG. 1). When the third copy is located physically apart from the equipment, an additional back-up is achieved for greater damages, e.g. fire damages.

Figure 3B:
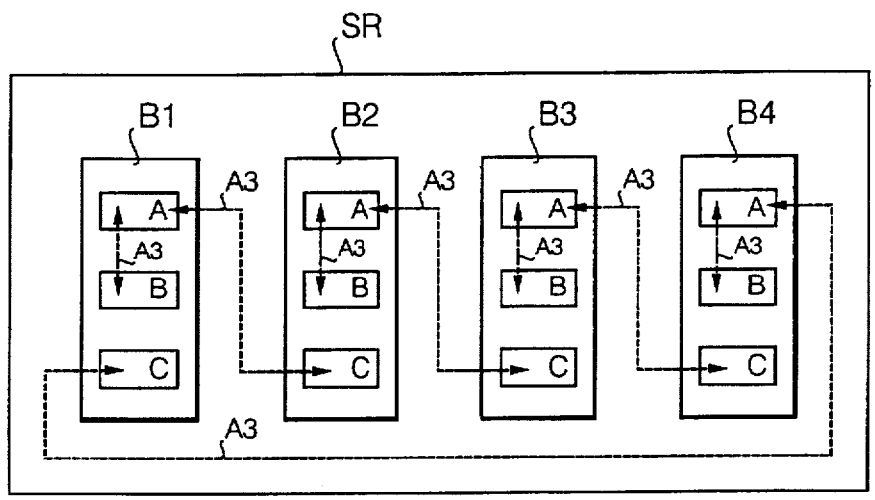

After the above measures, the equipment is ready for use and can start operating normally as is described in FIG. 3b. During normal operation, the control unit CU of the equipment performs a checking of the copies at regular intervals, comparing all three copies with each other. The comparison can be performed as a comparison bit by bit or by calculating a checksum from the set data and by comparing those with each other. The comparison is shown in the figure by two-way arrows A3. If it is discovered as a result of comparison that a fault has arisen e.g. in the actual operating copy in the storage area A of a board unit, the faultless data are copied either from the storage area B or C to the storage area A.

The advantage of the use of checksum is that it functions as an additional back-up also e.g. in such a case when two copies are similar but erroneous. If this would be the case, checksums taken from the two storage areas (being wrong) inform that the right version is the (third) version having the right checksum.

During normal operation, a need to change the settings of a board unit may also occur. The reason can be, e.g., that-the client desires to transmit his or her traffic, e.g. in the night-time to another location than in the daytime. Then the concerned parameter of the board unit in question is changed and the same change is made automatically, as a response to the first change command, in all three copies. An observation of a change made in the operating copy may, in principle, be achieved also by the above comparison function, but an updating of data occurs then more slowly than if it were made automatically in all three copies.

Figure 3C:
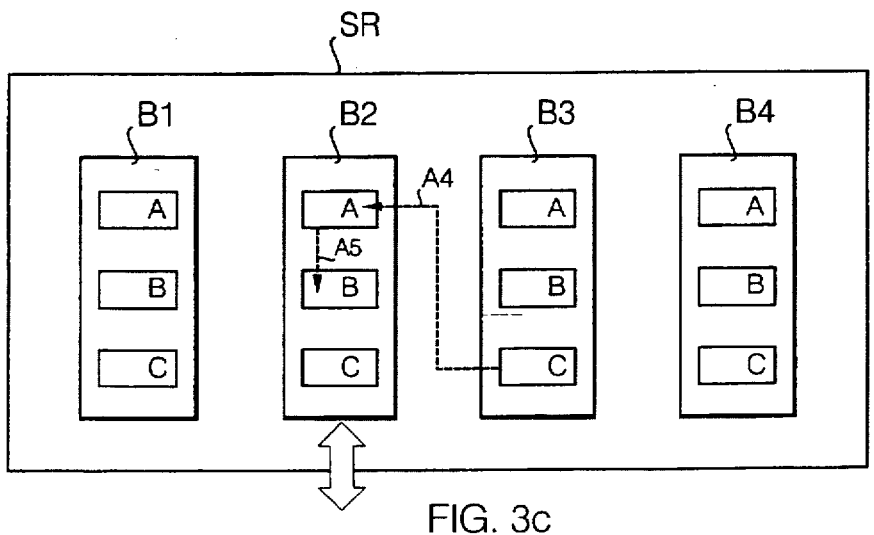

A change of a faulty board unit is described in FIG. 3c. If one or more board units of the equipment are damaged, it (e.g. board unit B2 in FIG. 3c) has to be removed from the equipment configuration and a new board unit has to be mounted in place thereof. Then, the control unit of the equipment first reads the first identification number (board type) of the new board unit and compares it with the identification number in the memory of another board unit of similar type (e.g. a neighbour board unit) already existing in the equipment. If the new board unit is provided with correct identification number, it is known to be of correct type and can be accepted to belong to the equipment configuration. If the identification number of the new board unit is faulty, the equipment gives the mounter an information of the board unit of wrong type. Accordingly, a board unit of wrong type can be prevented from starting up in the equipment by the use of the first identification number.

The control unit CU may also have a list of acceptable identification numbers in its memory, due to which the identification number of the other board unit needs not be used for the comparison. This list may be board location specific, informing which type of board unit can be accepted for which board location. In any case, a comparison of the identification number of a new board unit with the identification number stored in the memory of the other board unit presupposes that it is known that the two board locations should comprise a board unit of the same type.

Upon acceptance of the first identification number, the control unit reads next the random number (specific number for each equipment configuration) stored in the new board unit and compares it with the random number stored in another, e.g. neighbour board unit. If these differ from each other, the settings of the neighbour board unit are copied to the new board unit. This is indicated by dashed line arrows A4 in FIG. 3c. Additionally, a second back-up copy is taken of the settings for the storage area B (dashed line arrow A5) of the own board unit. Subsequently, the equipment may continue its normal operation again. If the random numbers to be compared are mutually identical, the control unit knows that the same board unit has been positioned in the equipment again, due to which it is not necessary to copy the settings and the equipment may continue its operation immediately. Such a situation may arise if a board unit requires only little maintenance, e.g. resetting a jumper.

By the use of the second configuration-specific identification number (random number), it is possible to avoid unnecessary writing in the EEPROM and to lengthen the life of the memory and through that probably also the time between failures of the whole equipment (operating life of EEPROMs depends on the number of writings and erasings performed).

A still higher back-up is achieved in the above described comparison by the addition of the date and time of the configuration to the set data; if the random numbers accidentally were the same, though the board unit in question has not been in said equipment before, a comparison of dates and times discloses at the latest that the board unit pushed into the equipment is not the same as was there earlier. The probability of the random numbers of the old and the new board unit being identical is very little, when a sufficient amount of bits, e.g. 16 bits ($21^{16}$=65536) are used in the random number.

When the address of the board unit itself in the equipment is also stored in the board unit, the equipment is capable of giving an error information to the mounter, if this mounts a board unit having been in the equipment already earlier by mistake into a wrong, e.g. neighbour board location.

If a new equipment configuration is made, e.g. a new board unit is added to an empty board location, a new back-up loop is always formed on the principle set forth above, in which loop the back-up copy of the set data of the board unit is always found in another, preferably neighbour board unit. For the new back-up loop is also calculated a new random number, which is written over the old random numbers in order to know that the equipment configuration has changed. Accordingly, the random number is an identification number identifying the back-up loop as well. If date and time are used as additional back-up, these new data are written over the old date and time in each board unit.

When the equipment is reset (e.g. in consequence of a power failure caused by thunder or the like), the control unit recreates, by using above maentioned data, a back-up loop for settings, in which loop the back-up copy of the set data of the board unit is always found in another, preferably neighbour board unit. If the control unit discovers at start-up that the set data in the board unit are different, it compares the copies with the copy in the neighbour board unit. If two of these copies are identical, they are accepted to be correct, supposing that the checksum is correct, and the correct data are copied to necessary storage areas.

It is not absolutely necessary to store the back-up copy expressly in a neighbour board unit, but it can be stored in any other board unit in principle. By the use of expressly neighbour board unit, e.g. the advantage is achieved, however, that the re-configuring mounter knows a very simple rule, according to which two neighbour board units never must be simultaneously absent from the equipment. Accordingly, the use of neighbour board unit (e.g. the right-hand one seen from the front of the subrack) as a storage location of the backup copy of each board unit offers a very clear rule for the mounter.

Though the equipment thus comprises board units implementing telecommunications functions of very different kinds, all board units have the common feature that they comprise a mutually identical storage area for storing back-up copies. In this sense they all seem to be similar outwards (to the control unit).

Though the invention is described above with reference to embodiments according to the enclosed drawings, it is clear that the invention is not restricted thereto, but it can be modified within the scope of the inventive idea set forth above and in the attached claims. Instead of EPROM, any type of memory may be used in which it is possible to write during the operation of the equipment and which keeps the data stored in spite of a power failure (e.g. withdrawal of board unit). Such types of memories are, e.g., battery back-up memories and flash-type memories. All above-mentioned data, e.g. address data of back-up copies, need not be located absolutely in the very board units either, if only the equipment contains said data for each board unit. On the other hand, e.g. the first and second identification number have to be included in each board unit in order to make it possible to bring these data from the new board unit to the control unit.

I claim:

1. A back-up method for equipment settings of electronic equipment which has a plurality of parallel board units located in a subrack comprising the steps of:

storing set data of each board unit in a first storage area of that board unit; storing a back-up copy of the set data of each board unit initially, in connection with outfitting said subrack with each said board unit said storing including storing the respective addresses of two of said board units in the set data for each board unit in such a way that a first address indicates another said board unit in which is stored a back-up copy of the set data of the respective board unit, and a second address indicates a respective other one of said units a back-up copy of the set data of which is stored in the respective board unit.

2. The method according to claim 1, further comprising:

storing in each said board unit a first identification number identifying the type of the respective board unit; and in connection with mounting a respective said board unit in which a first identification number has been stored in said subrack as a new board unit, initially checking the first identification number from the new board unit in order to prevent set data of wrong type from being copied to the new board unit.

3. The method according to claim 2, further comprising:

storing in each said board unit a second identification number stored in the set data of each board unit, which number identifying a configuration of said equipment; and changing each said second identification number to a new one when the equipment configuration is changed.

4. The method according to claim 3, further comprising:

when changing a new board unit into the equipment, checking said second identification number of the respective new board unit, if the first identification number of the new board unit has been found to be correct, and, only if the second identification number differs from the corresponding identification number of the respective back-up copy of set values stored in the respective said other board unit, copying the respective back-up copy of other board unit to said new board unit.

(b) if the second identification number is the same as the corresponding identification number of the back-up copy stored in said first board unit, no unnecessary copying is performed.

5. The method according to claim 4, further comprising:

using a random number generated by a random number generator as at least part of said second identification number.

6. The method according to claim 5, wherein:

said second identification number further includes information as to a date and time informing when said equipment configuration was made.

7. The method according to claim 2, wherein:

the set data of each board unit include information as to the address of the respective board unit in equipment; and said method further includes checking the respective when a new board unit is mounted in the equipment.

8. The method according to claim 2, further comprising:

at an installation/start-up stage of said equipment, storing an additional back-up copy of the set data of each board unit in a second storage area of the respective board unit.

9. The method according to claim 8, wherein:

said set data as stored in each respective storage area includes a storage area-specific checksum.

10. The method according to claim 2, further comprising:

an installation/start-up stage of said equipment, storing an additional back-up copy of the set data of each board unit outside said board units, in a microcomputer associated with said equipment.

11. The method according to claim 2, wherein:

said set data as stored in each respective storage area includes a storage area-specific checksum.

12. The method according to claim 1, wherein:

said board units are arranged in an array in which respective ones of said units neighbor one another in a series having two opposite ends;

each said first and second address respectively belonging to a respective two board units neighboring the respective said board unit, one of the board units considered as neighboring each board unit which is at an end of said array being the board unit at the respective opposite end of said array.

* * * * *